Dec. 5, 1933.    R. WEBER    1,938,307
VALVE SEAT TOOL
Filed April 20, 1931
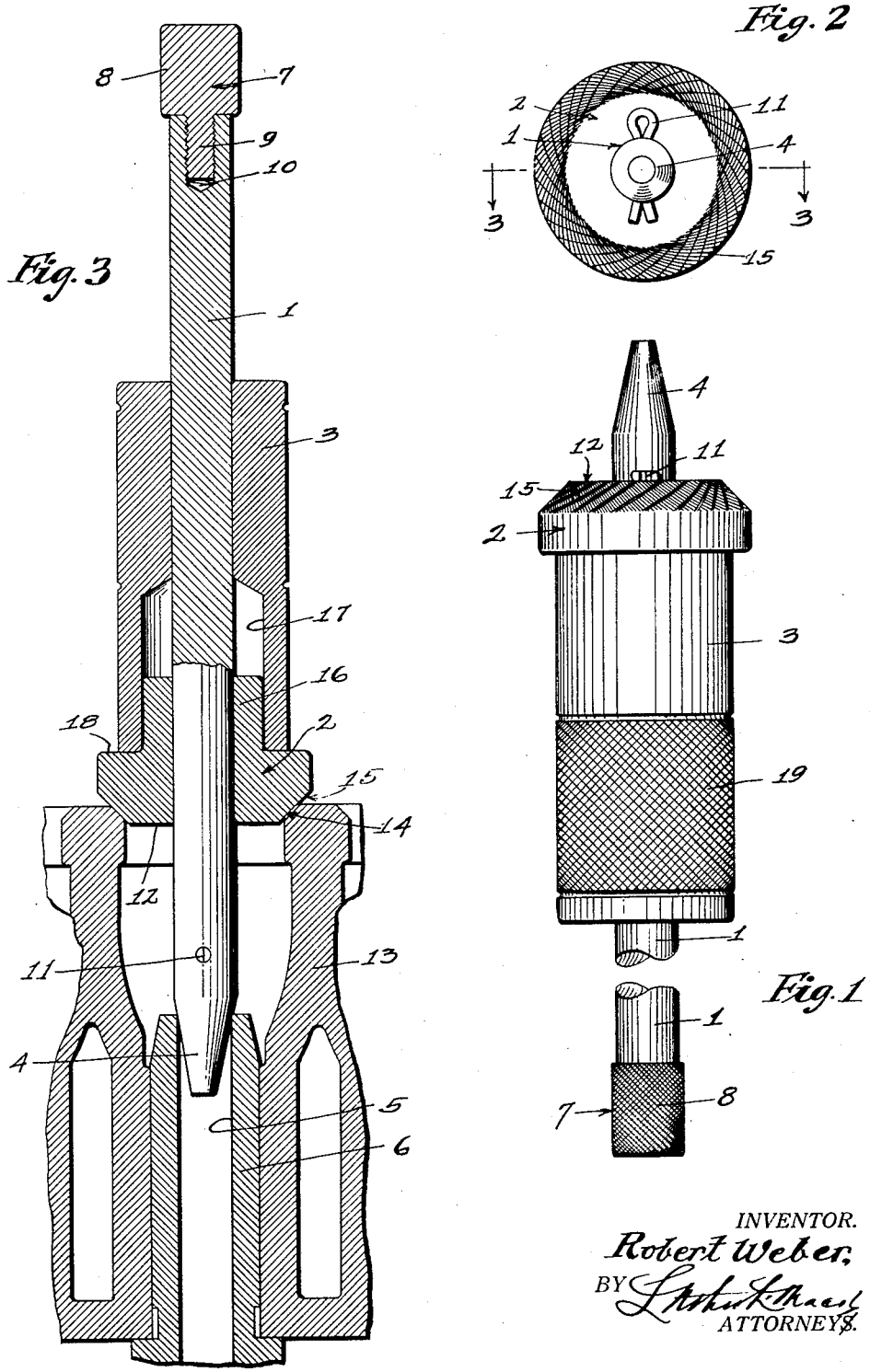
INVENTOR.
Robert Weber,
BY
ATTORNEYS.

Patented Dec. 5, 1933

1,938,307

UNITED STATES PATENT OFFICE 1,938,307

VALVE SEAT TOOL

Robert Weber, Los Angeles, Calif., assignor to Weber Tool Mfg. Co., Los Angeles, Calif., a corporation of California Application April 20, 1931. Serial No. 531,359

2 Claims. (Cl. 29—81)

This invention relates to valve seat tools, and more particularly to a tool or implement adapted to be employed for chipping or breaking the scale or glazed surface of a valve seat preliminary to a regrinding operation.

It is adapted principally for use in connection with the resurfacing of poppet valve seats. It will be understood that valve seats of motor vehicle engines, after considerable use, acquire a glazed and substantially hardened surface, due to the heat generated by the motor and the constant seating of the valves, which is not always capable of ready removal by grinding. Or, if indeed it is capable of being removed by grinding, it requires a long and tedious operation.

It is an object of this invention, therefore, to provide a tool including a central stem which will center itself in the valve stem guide of a motor block, a head adjustable and slidable on the stem and provided with a beveled surface corresponding in angularity and for engagement with the valve seat, and a weighted hammer in the form of a sleeve also slidable on the stem and adapted to forcibly engage the head when manually reciprocated on the stem for indenting or cutting the scale or surface of the valve seat so that the ensuing grinding operation may be speedily accomplished.

The invention contemplates the provision of a serrated hardened surface on the tool head fashioned somewhat like a milling tool, for engagement with the valve seat.

A further object is to so form the several parts of the device that a single tool may be adapted for use on different sizes, styles and types of poppet valve seats and valve guides.

Still other objects may appear as the description progresses.

In the accompanying drawing I have shown a preferred form of invention in which

Fig. 1 is an external view of the assembled tool in inverted position.

Fig. 2 is an end view of the tool head and stem.

Fig. 3 is a sectional elevation of the tool on line 3—3 of Fig. 2, shown in operative association with the valve seat and guide of a motor block.

As illustrated in the drawing, the device includes an elongated stem 1, on which are slidably mounted the tool head 2 and the hammer or striker 3. The stem 1 is of uniform diameter thruout its length, except for the lower end 4 thereof, which is tapered so as to fit the bore 5 of valve stem guides 6 of any size within a substantial range.

The opposite end of stem 1 has a detachable stop member 7 which is provided with a head 8 having a knurled periphery and a threaded stem 9 adapted to be screwed into a threaded bore 10 in the end of the stem. The head of member 7 is slightly larger than the body of stem 1 so as to prevent the displacement of the operating sleeve 3 from the stem and to limit the upward thrust of said sleeve on the stem.

Above the tapered end 4 of the stem a pin 11 is extended diametrically thru and is fixed in the body of the stem and serves as an abutment against which the end 12 of the head 2 engages for preventing the displacement of the head 2 and sleeve 3 from the stem. It will be observed by reference to Fig. 3 that the valve guide 6 is diametrically alined in the motor block 13 with the valve seat 14, and the head 2 is provided with a beveled cutting surface 15 with teeth suitably formed thereon in a manner similar to the form of teeth on a milling machine cutter for engagement with the valve seat 14. The beveled cutting surface 15 of head 2 is of substantial diameter and width so that the head may accommodate itself to valve seats of different size.

The head 2 has an upwardly projecting and reduced extension 16 which slidably engages a bore 17 formed in the lower side of sleeve 3. A shoulder 18 is thus provided on the upper side of the head for engagement by the lower end of the sleeve 3. The arrangement and form of head 2 and sleeve 3 is such that the thrust of the sleeve against the head will be at points substantially over the valve seat. Sleeve 3 has a knurled grip portion 18 which facilitates the reciprocation of the sleeve on stem 1 for forcibly projecting the sleeve against the head 2 when the head engages the valve seat.

In operation the tool is mounted as illustrated in Fig. 3 with the tapered end 4 of the stem seated in the upper end of the valve guide 6, and the head 2 and sleeve 3 are elevated until the stem is seated, whereupon the head is dropped into position on the valve seat 14.

The operating sleeve 3 is then raised and lowered several times in succession with substantial force so as to project the sleeve against the head and cause the cutting surface 15 of the head to indent or cut the valve seat surface.

This operation is continued and the cutting head 2 may be slightly rotated after one or more operations by first raising the head and then slightly turning it to a new position on the valve seat. Usually a few operations of the sleeve 3 and a few turns of the head 2 will suffice to break the scale or the hardened surface of the valve seat sufficiently to permit the ready regrinding of the valve seat.

Where the valve seats have been pitted by long use without regrinding, the head 2 is effective for more or less uniformly indenting or breaking the valve seat surface so that in a regrinding operation a perfectly smooth uniform surface may be more quickly provided than where it is sought to remove the pits by grinding alone.

It will be understood that I may modify my invention within the scope of the appended claims without departing from the spirit thereof.

What I claim is:

1. A valve seat finishing tool comprising an elongated stem, a cutting head and a striker axially alined and independently slidable on said stem intermediate the ends of the stem, said head having an annular portion underlying the adjacent end of said striker and adapted to be engaged by the striker, and a beveled cutting face for engagement with a valve seat, said stem having one end thereof tapered for insertion in a valve stem guide whereby to center said head relative to a valve seat, for the purpose described.

2. A valve seat finishing tool comprising an elongated stem, a cutting head and a striker axially alined and independently slidable on said stem intermediate the ends of the stem, said head having an annular portion underlying the adjacent end of said striker and adapted to be engaged by the striker, the annular portion of said head having a beveled cutting face for engagement with a valve seat, said stem having one end thereof tapered for insertion in a valve stem guide whereby to center said head relative to a valve seat, and a detachable member on the other end of said stem for limiting the upward movement of the striker on the stem.

ROBERT WEBER.